(12) United States Patent
Yamamoto et al.

(10) Patent No.: US 10,233,825 B2
(45) Date of Patent: Mar. 19, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Yasuhiro Yamamoto, Chiryu (JP); Taketo Nagasaki, Nagakute (JP); Yosuke Miyamoto, Toyota (JP); Naoyuki Miyara, Nagoya (JP); Hajime Takagawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 15/257,004

(22) Filed: Sep. 6, 2016

(65) Prior Publication Data

US 2017/0067390 A1 Mar. 9, 2017

(30) Foreign Application Priority Data

Sep. 8, 2015 (JP) ................................. 2015-176934

(51) Int. Cl.
*F02F 1/42* (2006.01)
*F02B 23/00* (2006.01)
*F02B 31/04* (2006.01)

(52) U.S. Cl.
CPC ............ *F02B 23/00* (2013.01); *F02F 1/4235* (2013.01); *F02B 31/04* (2013.01); *F02B 2275/48* (2013.01); *Y02T 10/125* (2013.01); *Y02T 10/146* (2013.01)

(58) Field of Classification Search
CPC .. F01L 3/06; F02B 31/04; F02B 23/00; F02B 2275/48; F02F 1/425; F02F 1/4235; Y02T 10/125; Y02T 10/146
(Continued)

(56) References Cited

U.S. PATENT DOCUMENTS 2,921,571 A * 1/1960 Vogel .................... F02F 1/4235
                                                    123/188.14
4,207,854 A * 6/1980 Alford .................. F02F 1/4242
                                                    123/188.14
(Continued)

FOREIGN PATENT DOCUMENTS

AT           000283 U1     7/1995
EP           0790398 A1 *  8/1997
(Continued)

OTHER PUBLICATIONS

U.S. Appl. No. 15/167,282, filed May 27, 2016 in the name of Yamamoto et al.

*Primary Examiner* — Sizo B Vilakazi
*Assistant Examiner* — Brian R Kirby
(74) *Attorney, Agent, or Firm* — Oliff PLC (57) ABSTRACT

An intake port of an internal combustion engine is connected to a combustion chamber and includes a connecting portion having a passage cross-sectional area that increases as the connecting portion approaches the combustion chamber, and an upstream portion connected to an upstream end of the connecting portion. The connecting portion is provided at its downstream end with a valve seat with which an umbrella part of an intake valve is brought into contact. At least one recess extending in an extending direction of the intake port and included in the connecting portion and the upstream portion is provided at least at one of two portions, the two portions located on both sides in an extending direction of an output shaft, of a peripheral surface of the intake port.

3 Claims, 6 Drawing Sheets (58) Field of Classification Search
USPC .......................................... 123/308, 188.14
See application file for complete search history.

(56) References Cited

U.S. PATENT DOCUMENTS

| | | | | | |
|---|---|---|---|---|---|
| 4,302,935 | A | * | 12/1981 | Cousimano | F01N 13/10 123/193.5 |
| 4,308,830 | A | * | 1/1982 | Yamada | F02B 31/06 123/188.14 |
| 4,491,102 | A | * | 1/1985 | Nakasima | F02B 31/082 123/188.14 |
| 4,498,435 | A | * | 2/1985 | Kromer | F02B 31/06 123/188.14 |
| 4,606,308 | A | * | 8/1986 | Furlong | F02F 1/4228 123/188.14 |
| 4,700,669 | A | * | 10/1987 | Sakurai | F02B 31/06 123/188.14 |
| 4,765,294 | A | * | 8/1988 | Katsumoto | F02B 31/06 123/188.14 |
| 5,165,374 | A | * | 11/1992 | Chapman | F02B 31/06 123/308 |
| 5,394,845 | A | * | 3/1995 | Noh | F02B 31/00 123/188.14 |
| 5,423,300 | A | * | 6/1995 | Ando | F02B 17/00 123/188.14 |
| 5,558,061 | A | * | 9/1996 | Suminski | F02B 31/00 123/188.14 |
| 5,605,123 | A | * | 2/1997 | Ohmura | F02B 31/00 123/188.14 |
| 6,047,473 | A | * | 4/2000 | Brignall | F02F 1/4228 123/308 |
| 6,213,090 | B1 | * | 4/2001 | Tamai | F02B 31/085 123/308 |
| 6,250,281 | B1 | * | 6/2001 | Takii | F02F 1/4214 123/188.14 |
| 6,363,903 | B1 | * | 4/2002 | Hayashi | F02D 13/0226 123/193.5 |
| 6,374,793 | B1 | * | 4/2002 | Narita | F02F 1/4285 123/193.5 |
| 6,431,140 | B1 | * | 8/2002 | Nishimura | F01L 3/06 123/188.14 |
| 6,655,347 | B2 | * | 12/2003 | Takamiya | F02F 1/4235 123/301 |
| 6,799,551 | B2 | * | 10/2004 | Nakakita | F02B 23/0621 123/279 |
| 6,880,510 | B2 | * | 4/2005 | Laimbock | F02B 31/00 123/188.8 |
| 7,182,057 | B2 | * | 2/2007 | Sato | F02F 1/4235 123/193.5 |
| 7,409,944 | B2 | * | 8/2008 | Tsuchiya | F02B 31/06 123/306 |
| 7,938,099 | B2 | * | 5/2011 | Abe | F02B 31/06 123/306 |
| 9,103,277 | B1 | * | 8/2015 | Gurney | F02M 35/10091 |
| 9,790,845 | B2 | * | 10/2017 | Abe | F02B 31/00 |
| 2001/0006056 | A1 | * | 7/2001 | Ichikawa | F02B 31/02 123/308 |
| 2003/0168040 | A1 | * | 9/2003 | Takamiya | F02F 1/4235 123/306 |
| 2004/0231638 | A1 | * | 11/2004 | Tominaga | F01L 3/06 123/308 |
| 2010/0037840 | A1 | * | 2/2010 | Amano | F01L 3/06 123/90.5 |
| 2012/0304950 | A1 | * | 12/2012 | Abe | F02B 31/00 123/188.1 |
| 2014/0305403 | A1 | * | 10/2014 | Tosato | F02F 1/425 123/306 |

FOREIGN PATENT DOCUMENTS

| | | | | |
|---|---|---|---|---|
| JP | 2003214169 | A | * | 7/2003 |
| JP | 2003214169 | A | * | 7/2003 |
| JP | 2004143954 | A | * | 5/2004 |
| JP | 2005-061368 | A | | 3/2005 |
| JP | 2005113737 | A | * | 4/2005 |
| JP | 2005-120998 | A | | 5/2005 |
| JP | 2008-255860 | A | | 10/2008 |
| JP | 2009-007953 | A | | 1/2009 |
| WO | WO01/57376 | A1 | * | 8/2001 |

* cited by examiner

INTERNAL COMBUSTION ENGINE

INCORPORATION BY REFERENCE

The disclosure of Japanese Patent Application No. 2015-176934 filed on Sep. 8, 2015 including the specification, drawings and abstract is incorporated herein by reference in its entirety.

BACKGROUND

1. Technical Field

The disclosure relates to an internal combustion engine that introduces intake air into a combustion chamber through an intake port, thereby generating a tumble flow in the combustion chamber.

2. Description of Related Art

Figure 11:
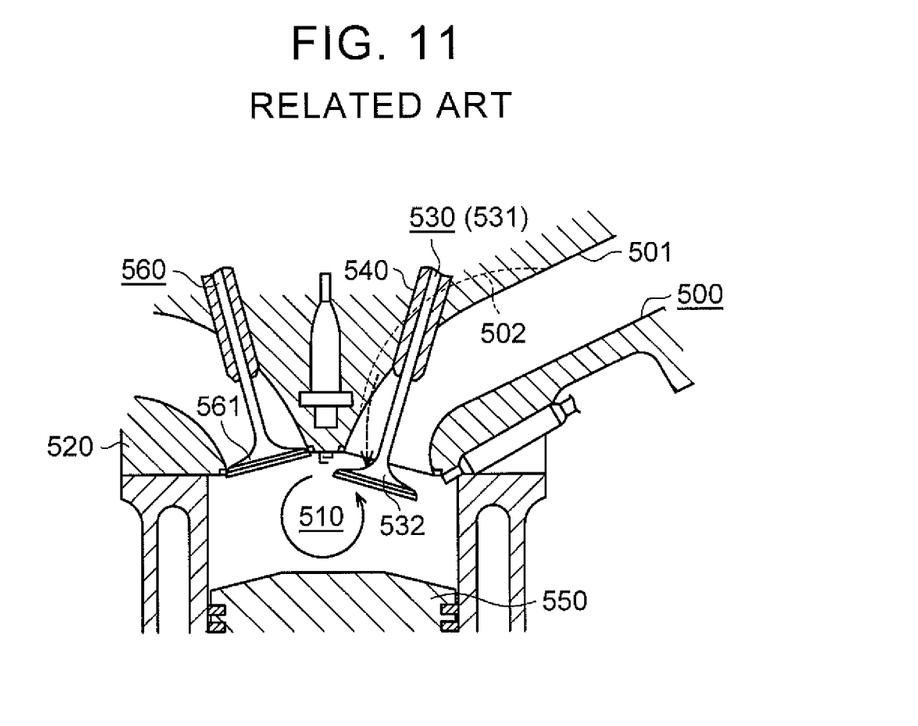
FIG. 11 is a sectional view showing a part of an internal combustion engine of a related art.

Japanese Patent Application Publication No. 2008-255860 (JP 2008-255860 A) discloses an internal combustion engine that generates a tumble flow in a combustion chamber. That is, as shown in FIG. 11, the intake air introduced into a combustion chamber 510 through an intake port 500 flows in a counterclockwise direction in the figure, thereby generating a tumble flow in the combustion chamber 510. A cylinder head 520 of this internal combustion engine is provided with a tubular valve guide 540 by which a stem 531 of an intake valve 530 is slidably supported. One end in a longitudinal direction of the valve guide 540 (i.e., the lower end of the valve guide 540 in FIG. 11) protrudes into the intake port 500.

On a peripheral surface 501 of the intake port 500 near the valve guide 540, a groove 502 is provided which extends in an extending direction of the intake port 500 around the valve guide 540. That is, the groove 502 is provided on the peripheral surface 501 of the intake port 500 at a portion on the side away from the combustion chamber 510 (i.e., on the upper side of the peripheral surface 501 in FIG. 11). With this configuration, a portion of the intake air flowing in the intake port 500 flows in the groove 502 so that the flow of the intake air that bypasses the valve guide 540 can be formed in the intake port 500. As a result, the intake air is less likely to collide with the valve guide 540 so that it is possible to suppress a reduction in the flow velocity of the intake air into the combustion chamber 510 due to collision of the intake air with the valve guide 540.

SUMMARY

As shown in FIG. 11, the depth of the groove 502 gradually decreases approaching its downstream end. Then, as shown by a broken-line arrow in FIG. 11, the intake air that flows in the groove 502 and flows out of its downstream end will flow toward an umbrella part 532 of the intake valve 530 when the intake valve 530 opens. That is, in the intake port 500, while the flow of the intake air that bypasses the valve guide 540 can be produced by providing the groove 502, the flow of the intake air directed perpendicularly to the combustion chamber 510 is also produced. Referring to the perpendicular flow of the intake air as a branch flow, and the flow of the intake air that flows into the combustion chamber 510 from the intake port 500 without flowing into the groove 502 as a main flow, there are cases where the main flow is pushed by the branch flow toward the piston 550 side, i.e., in the downward direction in the figure. This may change the flow direction of the intake air forming the main flow. As a result, the intake air flowing into the combustion chamber 510 from the intake port 500 is less likely to proceed to an umbrella part 561 of an exhaust valve 560 so that, as shown by a solid-line arrow in FIG. 11, the turning radius of the flow of the intake air decreases. Therefore, it may be difficult to create a strong tumble flow in the combustion chamber 510.

The embodiments provide an internal combustion engine that can suppress a reduction in the turning radius of the flow of the intake air in a combustion chamber, thereby generating a strong tumble flow in the combustion chamber.

An example configuration provides an internal combustion engine that is configured to introduce intake air to a combustion chamber and generate a tumble flow in the combustion chamber. The internal combustion engine includes a cylinder head including an intake port connected to the combustion chamber, an intake valve including an intake umbrella part, and an output shaft. The intake port includes a connecting portion and an upstream portion, the connecting portion has a passage cross-sectional area that increases as the connecting portion approaches the combustion chamber, and the upstream portion is connected to an upstream end of the connecting portion. The intake port includes a valve seat provided at a downstream end of the connecting portion, and the intake umbrella part of the intake valve is configured to contact the valve seat. The intake port has at least one recess provided at least at one of two portions, the two portions located on both sides in an extending direction of the output shaft, of a peripheral surface of the intake port, and the at least one recess extends in an extending direction of the intake port and is included in the connecting portion and the upstream portion.

According to the configuration described above, the recess extending in the extending direction of the intake port is provided at least at one of the two portions, on both sides in the extending direction of the engine output shaft, of the peripheral surface of the intake port. The recess is opened at the peripheral surface of a connecting portion of the intake port. A portion of the intake air flowing in the intake port flows into the recess and then flows into the combustion chamber from a downstream end of the recess. Therefore, the intake air flowing out of the downstream end of the recess is suppressed from flowing perpendicularly into the combustion chamber. That is, referring to the flow of the intake air flowing into the combustion chamber through the intake port without flowing into the recess as a main flow, and the flow of the intake air flowing into the combustion chamber after flowing in the recess as a branch flow, the main flow is unlikely to be pushed to the piston side by the branch flow. As a result, the intake air flowing into the combustion chamber from the intake port flows along a combustion chamber wall surface. That is, the turning radius of the flow of the intake air in the combustion chamber is unlikely to be small. Therefore, it is possible to suppress a reduction in the turning radius of the flow of the intake air in the combustion chamber. Thus, a strong tumble flow is generated in the combustion chamber.

The internal combustion engine may further include a cylinder block and an exhaust valve including an exhaust umbrella part. The cylinder head may be mounted on a mounting surface of the cylinder block. The exhaust umbrella part of the exhaust valve may include an exhaust valve bottom surface that faces toward the combustion chamber. The intake umbrella part of the intake valve may include a port-side umbrella surface that faces toward the intake port. A value ($\rho$) obtained by dividing a sum of a recess angle (ε) and an intake-side inclination angle (β) by 2 may be greater than zero and less than or equal to an exhaust bottom surface angle (θ), where the recess angle (ε) is an angle of an extending direction of the recess with respect to the mounting surface, the intake-side inclination angle (β) is an inclination angle of a portion, closest to the exhaust valve, of the port-side umbrella surface with respect to the mounting surface, and the exhaust bottom surface angle (θ) is an inclination angle of the exhaust valve bottom surface with respect to the mounting surface.

The intake air (main flow and branch flow) flowing into the combustion chamber from the intake port flows toward the umbrella part of the exhaust valve and a flow direction of the intake air is changed by the exhaust valve bottom surface of the umbrella part. Thereafter, the intake air flows along the exhaust valve bottom surface and then flows along an inner peripheral surface of a cylinder toward a top surface of the piston.

The value (ρ) obtained by dividing the sum of the recess angle (ε) and the intake-side inclination angle (β) by "2" is a representative value of an angle of a flow direction of a branch flow with respect to the mounting surface. Therefore, it is difficult to cause the branch flow to flow along the exhaust valve bottom surface when the value (ρ) is greater than the exhaust bottom surface angle (θ).

In an internal combustion engine according to the configuration described above, it is easy to cause the entire intake air (main flow and branch flow) flowing into the combustion chamber from the intake port to flow along the exhaust valve bottom surface. Then, after flowing along the exhaust valve bottom surface, the intake air flows along the inner peripheral surface of the cylinder. That is, it is possible to cause the intake air to flow along the combustion chamber wall surface so that it is possible to generate a strong tumble flow in the combustion chamber.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
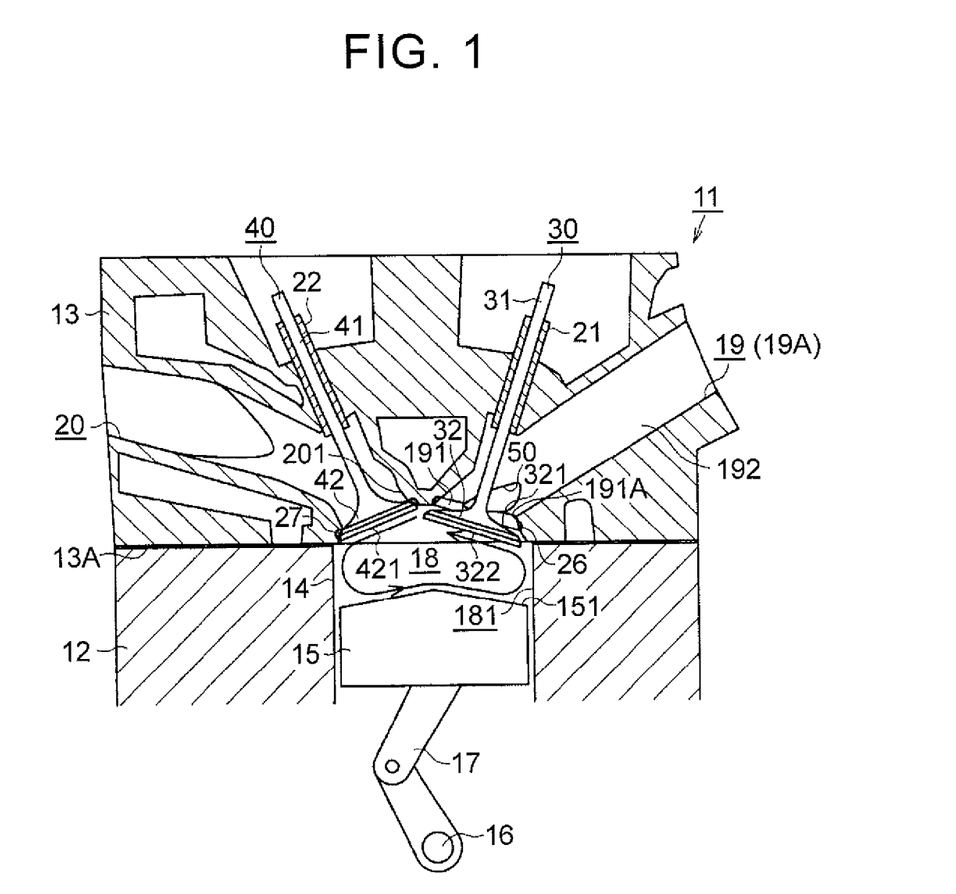
FIG. 1 is a sectional view showing a part of an embodiment of an internal combustion engine.

Hereinbelow, an embodiment of an internal combustion engine will be described with reference to FIGS. 1 to 10. As shown in FIG. 1, an internal combustion engine 11 of this embodiment includes a cylinder block 12 and a cylinder head 13 mounted on an upper portion in the figure of the cylinder block 12. In the cylinder head 13, its lower surface in the figure mounted on the cylinder block 12 will be referred to as a "mounting surface 13A".

The internal combustion engine 11 includes a plurality of cylinders 14 and a piston 15 that reciprocates vertically in the figure is provided in each cylinder 14. An engine output shaft 16 extends in a direction perpendicular to the sheet surface. The engine output shaft 16 is connected to the pistons 15 via connecting rods 17. A combustion chamber 18 is formed between a top surface 151 of the piston 15 and the cylinder head 13. A mixture of fuel and intake air is burned in the combustion chamber 18. In this embodiment, a surface defining the combustion chamber 18 will be referred to as a "combustion chamber wall surface 181," The combustion chamber wall surface 181 is constituted by an inner peripheral surface of the cylinder 14, the top surface 151 of the piston 15, and so on.

Figure 2:
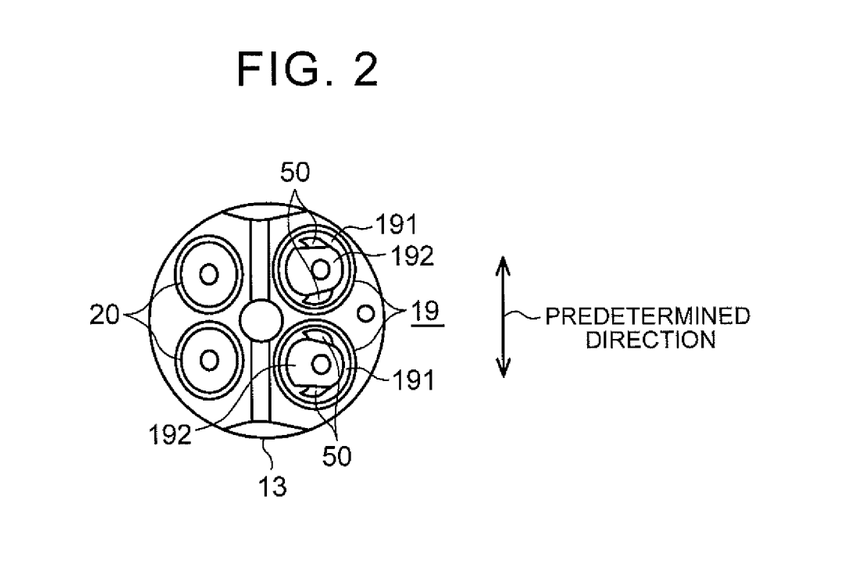
FIG. 2 is an exemplary diagram showing an arrangement of intake ports and exhaust ports when a cylinder head of the internal combustion engine is seen from the combustion chamber side.

As shown in FIGS. 1 and 2, the cylinder head 13 is provided with intake ports 19 for introducing the intake air into the combustion chambers 18 and exhaust ports 20 for discharging the exhaust gas generated by the combustion of the mixture in the combustion chambers 18. In the internal combustion engine 11 of this embodiment, two intake ports 19 and two exhaust ports 20 are provided for each cylinder 14. When the intake air is introduced into the combustion chamber 18 from both intake ports 19, the intake air flows along the combustion chamber wall surface 181 so that a tumble flow is generated as shown by an arrow in FIG. 1.

The internal combustion engine 11 further includes intake valves 30 each for opening and closing the intake port 19 with respect to the combustion chamber 18 and exhaust valves 40 each for opening and closing the exhaust port 20 with respect to the combustion chamber 18. The valves 30 and 40 each have a rod-like stem 31, 41 and an umbrella part 32, 42 provided at a tip of the stem 31, 41. The umbrella part 32 of the intake valve 30 has a port-side umbrella surface 321 as a surface facing the intake port 19 and an intake valve bottom surface 322 as a surface facing the combustion chamber 18. The umbrella part 42 of the exhaust valve 40 has an exhaust valve bottom surface 421 as a surface facing the combustion chamber 18. The intake valve bottom surface 322 and the exhaust valve bottom surface 421 each form a part of the surface forming the combustion chamber wall surface 181. The valves 30 and 40 are each supported by a generally circular tubular valve guide 21, 22 so as to be movable in an axial direction of the stem 31, 41 with respect to the cylinder head 13.

The intake port 19 has an intake connecting portion 191 as a connecting portion to the combustion chamber 18 and an intake upstream portion 192 as an upstream portion connected to an upstream end of the intake connecting portion 191. An intake valve seat 26 with which the umbrella part 32 of the intake valve 30 is brought into contact is provided at a downstream end of the intake connecting portion 191. The intake valve seat 26 is a laser-clad valve seat. The exhaust port 20 has an exhaust connecting portion 201 as a connecting portion to the combustion chamber 18 and the exhaust connecting portion 201 is provided with an exhaust valve seat 27 with which the umbrella part 42 of the exhaust valve 40 is brought into contact.

As shown in FIG. 1, the intake connecting portion 191 has a passage cross-sectional area that increases as it approaches the combustion chamber 18. In the intake connecting portion 191, its portion on the side away from the exhaust valve 40 (i.e., on the obliquely right lower side in the figure) is connected at a substantially right angle to the intake upstream portion 192. In this embodiment, the portion, connected at a substantially right angle to the intake upstream portion 192 as described above, of the intake connecting portion 191 will be referred to as a "separation wall 191A".

As shown in FIGS. 1 and 2, assuming that an extending direction of the engine output shaft 16 (i.e., a vertical direction in FIG. 2) is a predetermined direction, recesses 50 each extending in an extending direction of the intake port 19 are provided at respective portions, on both sides in the predetermined direction, of a peripheral surface 19A of the intake port 19. Downstream ends of the recesses 50 are located upstream of the valve seat 26 in the intake connecting portion 191, while each recess 50 spans the intake upstream portion 192 and the intake connecting portion 191.

The depth of each recess 50 gradually increases going downstream from its upstream end. That is, the recess 50 is configured to be deepest at its downstream end. Next, referring to FIGS. 3 to 5, a method of forming the intake connecting portion 191 of the intake port 19 in the cylinder head 13, a method of providing the valve seat 26 to the intake connecting portion 191, and a method of forming the recess 50 on the peripheral surface 19A of the intake port 19 will be described.

Figure 3:
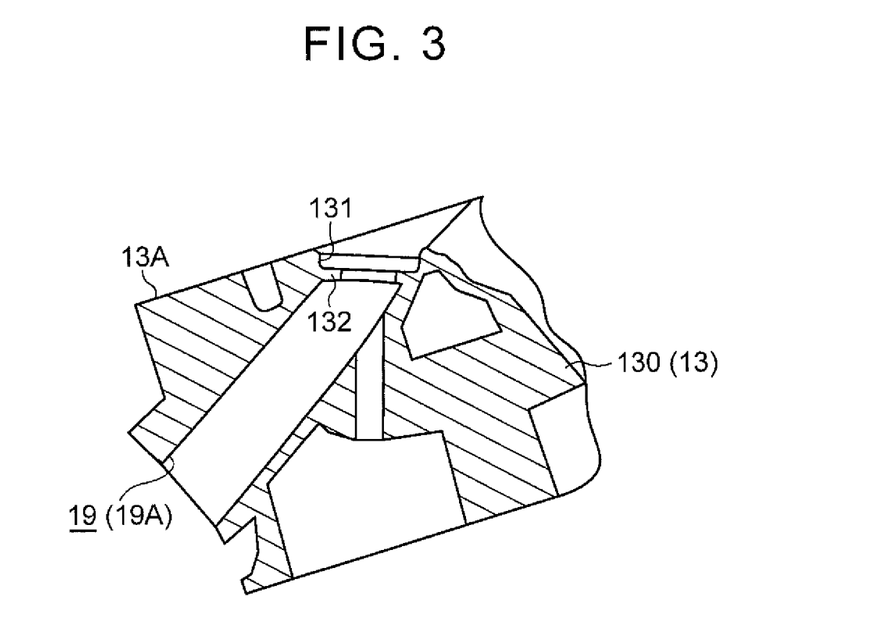
FIG. 3 is a sectional view showing a part of an unfinished cylinder head material, which is in a state before forming an intake connecting portion of the intake port, of the cylinder head.

FIG. 3 shows a part of an unfinished cylinder head material 130, which is the cylinder head 13 during processing. The cylinder head 13 is formed by processing the unfinished cylinder head material 130. As shown in FIG. 3, in the unfinished cylinder head material 130, at a portion that will be the intake connecting portion 191 of the intake port 19, there are provided an annular clad deposition groove 131 and an annular bottom plate portion 132 projecting radially inward and located at a position farther from the combustion chamber 18 than the clad deposition groove 131.

Figure 4:
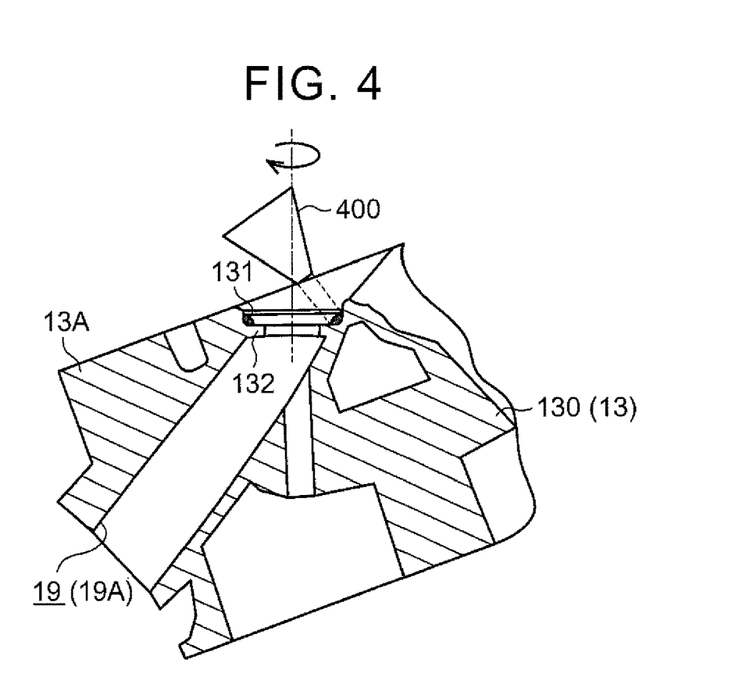
FIG. 4 is a sectional view exemplarily showing a state in which laser cladding is applied to the unfinished cylinder head material.

Then, as shown in FIG. 4, while supplying copper alloy powder as a material of the valve seat 26 to the clad deposition groove 131, a laser beam is irradiated to the supplied copper alloy powder from a laser output device 400. As a result, the copper alloy powder is melted by the laser beam so that the copper alloy is built up at a portion supplied with the copper alloy powder.

Figure 5:
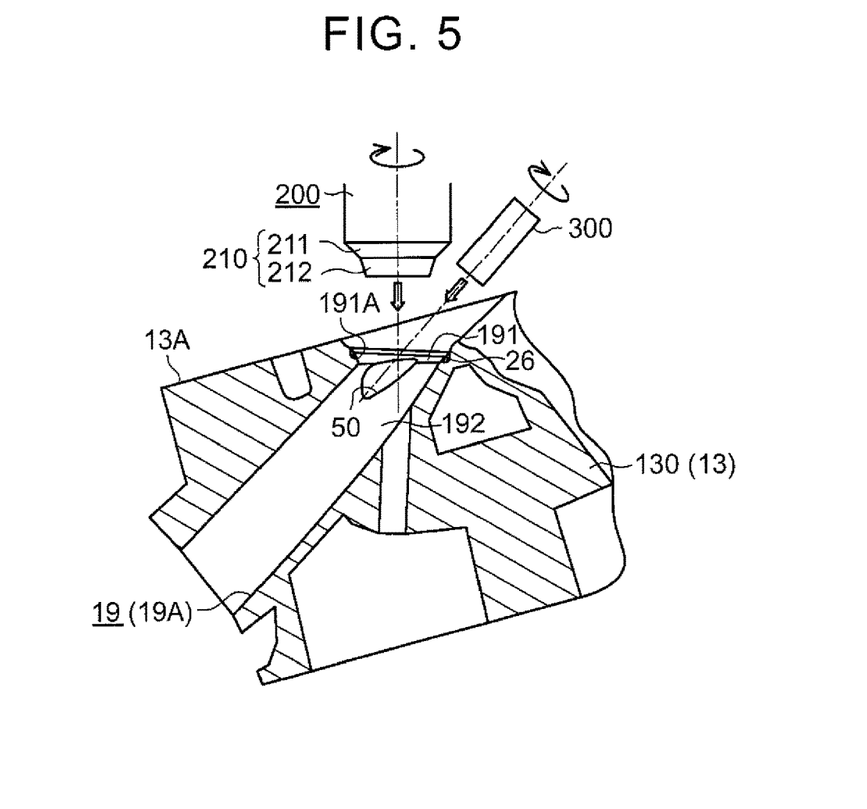
FIG. 5 is a sectional view showing a state in which processing is applied to the unfinished cylinder head material to form the intake connecting portion of the intake port and to provide a recess on a peripheral surface of the intake port.

Then, as shown in FIG. 5, using a bottom plate removal cutter 200, the intake connecting portion 191 is formed at the intake port 19 and processing of the intake valve seat 26 is carried out. In the bottom plate removal cutter 200, a processing part 210 located at its lower end in the figure has a two-step tapered shape. That is, the diameter of a first tapered portion 211 of the processing part 210 and the diameter of a second tapered portion 212 located on the side forward of the first tapered portion 211 each decrease going downward in the figure. The decreasing gradient of the diameter of the second tapered portion 212 is smaller than the decreasing gradient of the diameter of the first tapered portion 211 (that is, second tapered portion 212 tapers more gradually than first tapered portion 211).

By moving the bottom plate removal cutter 200 downward while rotating it, the bottom plate portion 132 is cut. In this event, a portion, near the exhaust port 20, of the bottom plate portion 132 is mostly cut off. In addition to the bottom plate portion 132, the body of the unfinished cylinder head material 130 is also cut off slightly by the bottom plate removal cutter 200. With this configuration, the passage cross-sectional area of the intake connecting portion 191 of the intake port 19 increases as it approaches the combustion chamber 18, and the intake connecting portion 191 is provided with the separation wall 191A.

In this event, the shape of an inner peripheral surface of the copper alloy described above is also processed by the bottom plate removal cutter 200. As a result, the intake valve seat 26 is formed at the downstream end of the intake connecting portion 191 of the intake port 19.

Then, as shown in FIG. 5, using a recess processing cutter 300, the recess 50 is formed on the peripheral surface 19A of the intake port 19. The recess processing cutter 300 has a generally cylindrical shape. By moving the recess processing cutter 300 into the intake port 19 while rotating it, a part of the peripheral surface 19A of the intake port 19 is cut off. As a result, the recess 50 extending in the extending direction of the intake port 19 is formed in the intake port 19.

Figure 6:
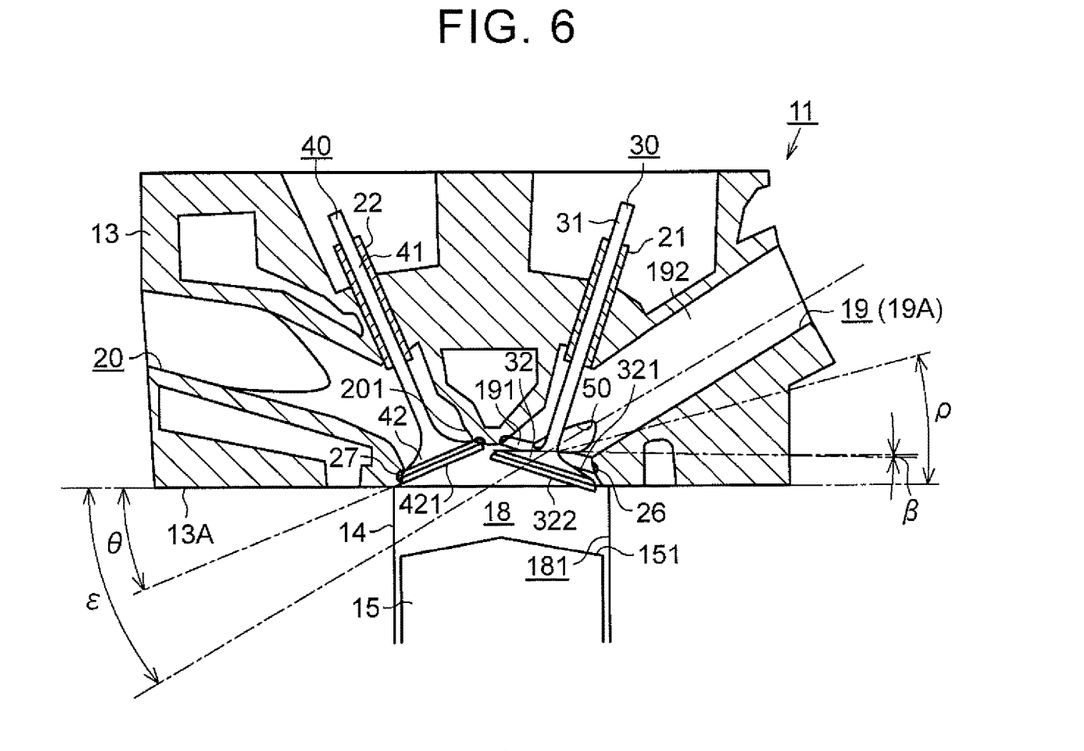
FIG. 6 is a sectional view showing a part of the internal combustion engine.

Herein, referring to FIGS. 6 and 7, the degree of the inclination of the recess 50 will be described. Various angles shown in FIG. 6 are relative angles with respect to the mounting surface 13A of the cylinder head 13.

An inclination angle of the exhaust valve bottom surface 421 of the umbrella part 42 of the exhaust valve 40 with respect to the mounting surface 13A is given as an "exhaust bottom surface angle θ (e.g., 15 to 35°)", an inclination angle of a portion, closest to the exhaust valve 40, of the port-side umbrella surface 321 of the umbrella part 32 of the intake valve 30 with respect to the mounting surface 13A is given as an "intake-side inclination angle β (e.g., −20 to +15°)", and an inclination angle of an extending direction of the recess 50 with respect to the mounting surface 13A is given as a "recess angle ε (e.g., 20 to 55°)". Then, an angle obtained by dividing the sum of the intake-side inclination angle β and the recess angle ε by "2" is given as a "first middle line angle ρ (e.g., 0 (zero) to 35°)". That is, it is set that $(ε+β)/2=ρ$. In this event, the first middle line angle ρ is greater than "0 (zero)" and less than or equal to the exhaust bottom surface angle θ. In other words, the recess 50 is formed so as to satisfy the following relational expression (1).

$$-β < ε ≤ 2×θ−β \qquad (1)$$

That is, the upper limit of the recess angle ε is an angle equal to "2×θ−β". On the other hand, while the lower limit of the recess angle ε is "−β", the recess 50 of which the recess angle ε is "−α" is unable to be formed on the peripheral surface 19A of the intake port 19. Therefore, the lower limit of the recess angle ε may be considered to be "0 (zero)". However, as described above, in this embodiment, the recess 50 is formed by moving the recess processing cutter 300 into the intake port 19 from the combustion chamber 18 side. Therefore, when the recess angle ε is "0 (zero)", it is not possible to advance the recess processing cutter 300 into the intake port 19. Therefore, the actual lower limit of the recess angle ε is greater than "0 (zero)" and is defined by the shape such as the diameter of the recess processing cutter 300. As described above, the recess 50 is configured to extend in the extending direction of the intake port 19. Therefore, an inclination angle of the extending direction of the intake port 19 with respect to the mounting surface 13A has some correlation with the recess angle ε.

Figure 7:
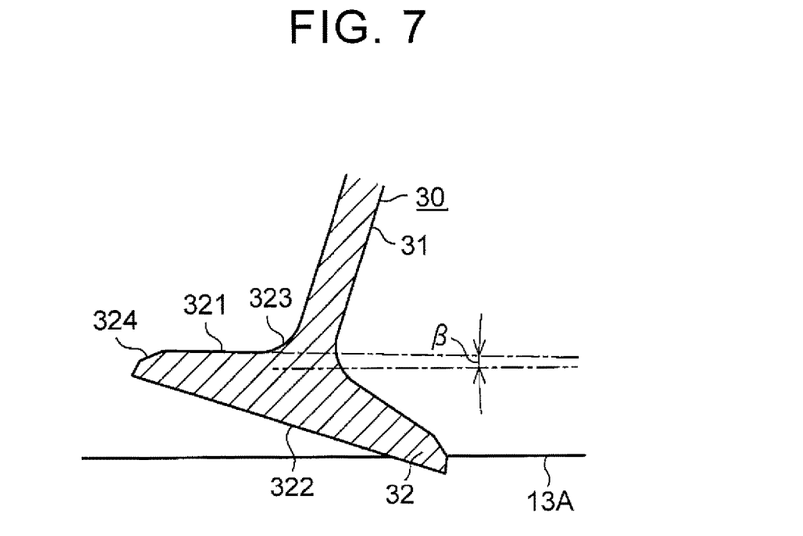
FIG. 7 is a sectional view showing a part of an intake valve of the internal combustion engine.

As shown in FIG. 7, the umbrella part 32 of the intake valve 30 includes, in addition to the port-side umbrella surface 321 and the intake valve bottom surface 322, a first connecting surface 323 and a second connecting surface 324. The first connecting surface 323 is a surface connecting between a peripheral surface of the stem 31 of the intake valve 30 and the port-side umbrella surface 321. The second connecting surface 324 is a surface connecting between the port-side umbrella surface 321 and the intake valve bottom surface 322. The first connecting surface 323 is connected to a radially inward end of the port-side umbrella surface 321, while the second connecting surface 324 is connected to a radially outward end of the port-side umbrella surface 321. When the intake valve 30 is sectioned along the axial direction of the intake valve 30, the first connecting surface 323 has a circular arc shape. On the other hand, while the port-side umbrella surface 321 and the second connecting surface 324 each have a substantially straight shape, the radial length of the second connecting surface 324 is extremely short compared to the radial length of the port-side umbrella surface 321.

Figure 8:
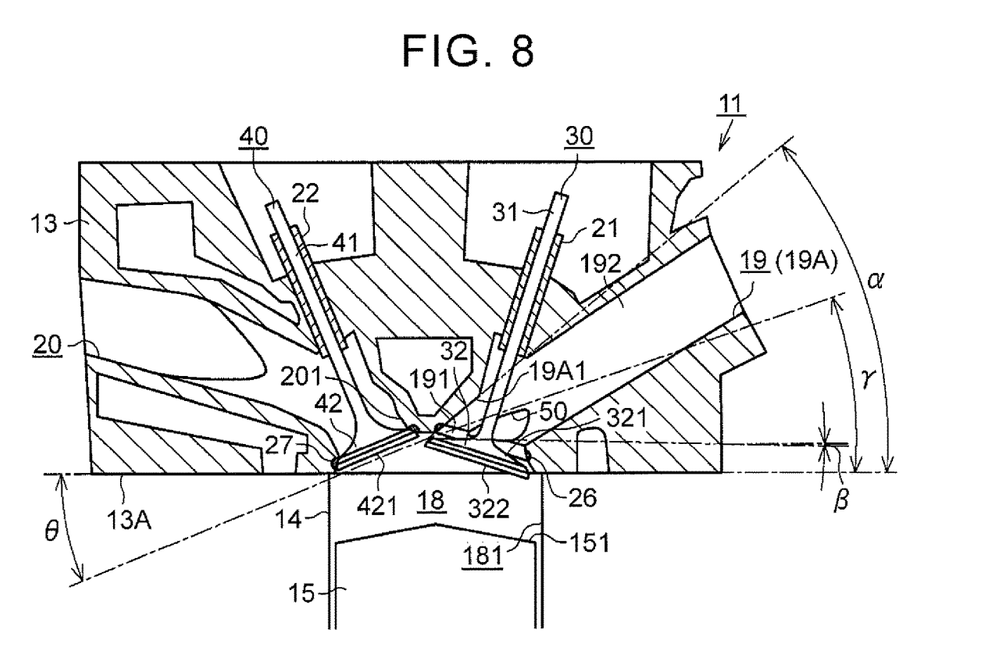
FIG. 8 is a sectional view showing a part of the internal combustion engine.
Figure 9:
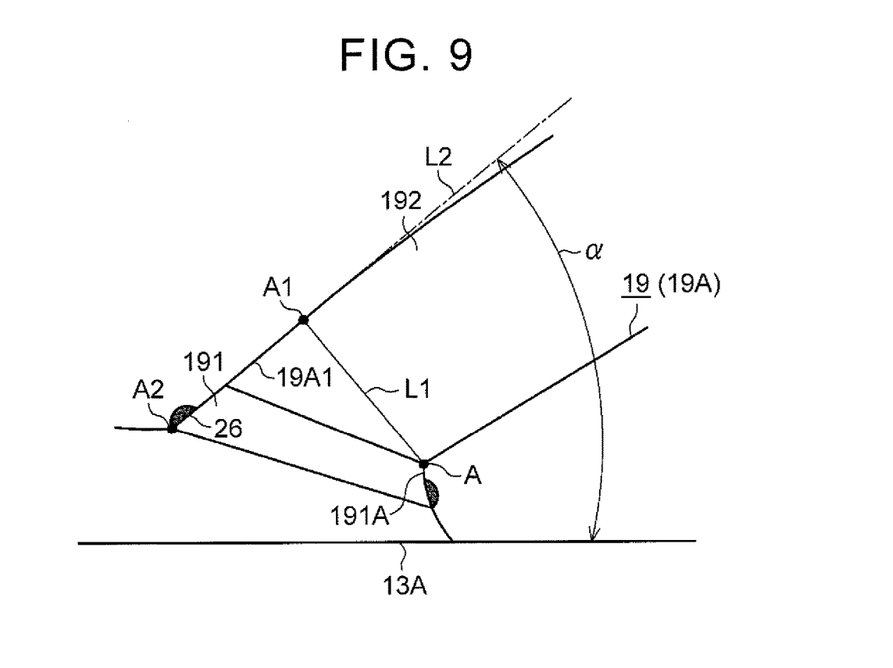
FIG. 9 is an exemplary diagram showing, on an enlarged scale, the intake connecting portion of the intake port and its peripheral portion.

Next, referring to FIGS. 8 and 9, the degree of the inclination of the intake connecting portion 191 of the intake port 19 will be described. Various angles shown in FIG. 8 are relative angles with respect to the mounting surface 13A of the cylinder head 13.

A portion extending in the extending direction of the intake port 19 from a position closest to the exhaust valve seat 27 in the peripheral surface 19A of the intake port 19 is given as an "intake port upper wall surface 19A1" and an inclination angle of the intake port upper wall surface 19A1 with respect to the mounting surface 13A is given as an "intake port upper wall surface angle α (e.g. 30 to 45°)". In this case, an angle obtained by dividing the sum of the intake port upper wall surface angle α and the intake-side inclination angle β by "2" is given as a "second middle line angle γ(e.g. 5 to 30°)". That is, it is set that $(α+β)/2=γ$. In this event, the second middle line angle γ is less than or equal to the exhaust bottom surface angle θ. That is, $(α+β)/2≤θ$. In other words, the intake connecting portion 191 is formed so as to satisfy the following relational expression (2).

$$α≤2×θ-β \quad (2)$$

The intake port upper wall surface angle α can be obtained as explained below. As shown in FIG. 9, an intersection point A1 between the intake port upper wall surface 19A1 and a perpendicular line L1 passing through a portion A between the separation wall 191A of the intake connecting portion 191 and the intake upstream portion 192 in the intake port 19 and being perpendicular to the intake port upper wall surface 19A1 is set. In addition, a downstream end A2 of the intake connecting portion 191 in the intake port upper wall surface 19A1 is set. Then, an inclination angle of a straight line L2 connecting between the intersection point A1 and the downstream end A2 with respect to the mounting surface 13A is given as the intake port upper wall surface angle α. As described above, the intake port upper wall surface angle α and the recess angle ε have some correlation with each other. In this embodiment, an absolute value of a difference between them $(=|α-ε|)$ is less than or equal to 10°.

In the meantime, when generating a tumble flow in the combustion chamber 18 by introducing the intake air into the combustion chamber 18 from the intake port 19, it is possible to strengthen a tumble flow by causing the intake air to flow along the combustion chamber wall surface 181. That is, by increasing the turning radius of the flow of the intake air flowing into the combustion chamber 18 from the intake port 19, a strong tumble flow is generated in the combustion chamber 18.

In this connection, when an inclination angle, with respect to the mounting surface 13A, of the intake air flowing into the combustion chamber 18 between the intake connecting portion 191 of the intake port 19 and the umbrella part 32 of the intake valve 30 is less than or equal to the exhaust bottom surface angle θ, which is the angle of the exhaust valve bottom surface 421, the intake air tends to flow toward the exhaust valve bottom surface 421. Therefore, in this case, when the intake air collides with the exhaust valve bottom surface 421, its flow direction is changed so that the intake air flows along the exhaust valve bottom surface 421.

On the other hand, when an inclination angle of the intake air flowing into the combustion chamber 18 with respect to the mounting surface 13A is greater than the exhaust bottom surface angle θ, the intake air does not tend to flow toward the exhaust valve bottom surface 421. Therefore, in this case, the turning radius of the flow of the intake air in the combustion chamber 18 decreases so that a tumble flow tends to weaken.

Figure 10:
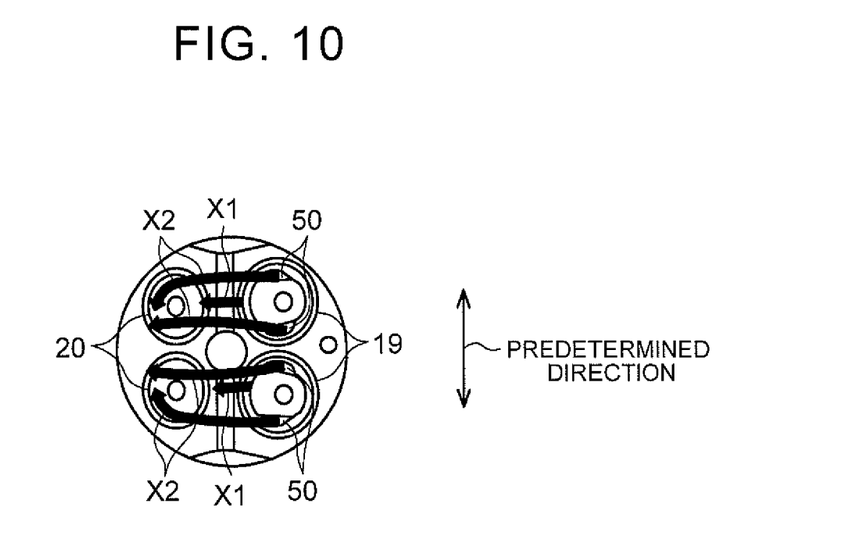
FIG. 10 is an action diagram for explaining the flow of intake air flowing into the combustion chamber from the intake ports in the internal combustion engine.

As shown in FIG. 10, the flow of the intake air flowing into the combustion chamber 18 from the intake port 19 without flowing into the recess 50 is referred to as a "main flow X1", while the flow of the intake air flowing into the combustion chamber 18 from the intake port 19 after flowing in the recess 50 is referred to as a "branch flow X2". In this case, an angle of a flow direction of the main flow X1 with respect to the mounting surface 13A is determined by the intake port upper wall surface angle α, which is the inclination angle of the intake port upper wall surface 19A1 of the intake port 19, and the intake-side inclination angle β. Therefore, the angle of the flow direction of the main flow X1 with respect to the mounting surface 13A can be presumed to be smaller than the intake port upper wall surface angle α and greater than the intake-side inclination angle β.

In the internal combustion engine 11 of this embodiment, the second middle line angle γ, which is the value obtained by dividing the sum of the intake port upper wall surface angle α and the intake-side inclination angle β by "2", is set to be greater than "0 (zero)" and less than or equal to the exhaust bottom surface angle θ, which is the inclination angle of the exhaust valve bottom surface 421. The second middle line angle γ is the representative value of the angle of the flow direction of the main flow X1 with respect to the mounting surface 13A. Therefore, the main flow X1 flowing into the combustion chamber 18 from the intake port 19 collides with the exhaust valve bottom surface 421 and, thereafter, the intake air forming the main flow X1 flows along the exhaust valve bottom surface 421. In this event, the closer the second middle line angle γ is to the exhaust bottom surface angle θ, the more the flow of the intake air along the exhaust valve bottom surface 421 tends to be formed. As a result, the turning radius of the flow of the intake air flowing into the combustion chamber 18 from the intake port 19 is less likely to become small.

Herein, it is assumed that the second middle line angle γ is greater than the exhaust bottom surface angle θ. In this case, the inclination angle, with respect to the mounting surface 13A, of the flow direction of the main flow X1 flowing into the combustion chamber 18 from the intake port 19 tends to be greater than the exhaust bottom surface angle θ. Therefore, it is difficult to cause the intake air to flow along the exhaust valve bottom surface 421 so that the turning radius of the flow of the intake air flowing into the combustion chamber 18 from the intake port 19 tends to be small.

On the other hand, an angle, with respect to the mounting surface 13A, of a flow direction of the branch flow X2, which is the flow of the intake air flowing into the combustion chamber 18 after flowing in the recess 50, is determined by the recess angle ε and the intake-side inclination angle β. Therefore, the angle of the flow direction of the branch flow X2 with respect to the mounting surface 13A can be presumed to be smaller than the recess angle ε and greater than the intake-side inclination angle β.

In the internal combustion engine 11 of this embodiment, the first middle line angle ρ, which is the value obtained by dividing the sum of the recess angle ε and the intake-side inclination angle β by "2", is set to be greater than "0 (zero)" and less than or equal to the exhaust bottom surface angle θ, which is the inclination angle of the exhaust valve bottom surface 421. The first middle line angle ρ is the representative value of the angle of the flow direction of the branch flow X2 with respect to the mounting surface 13A. Therefore, the branch flow X2 having passed through the recess 50 also flows along the exhaust valve bottom surface 421. In this event, also for the branch flow X2, the closer the first middle line angle ρ is to the exhaust bottom surface angle θ, the more the intake air tends to flow along the exhaust valve bottom surface 421. As a result, the turning radius of the flow of the entire intake air (main flow X1 and branch flow X2) flowing into the combustion chamber 18 from the intake port 19 is less likely to become small.

Herein, it is assumed that the first middle line angle ρ is greater than the exhaust bottom surface angle θ. In this case, the inclination angle, with respect to the mounting surface 13A, of the flow direction of the branch flow X2, which is the flow of the intake air flowing into the combustion chamber 18 after flowing in the recess 50, tends to be greater than the exhaust bottom surface angle θ. Therefore, it is difficult to cause the intake air forming the branch flow X2 to flow along the exhaust valve bottom surface 421 so that the turning radius of the flow of a portion of the intake air (i.e. the intake air forming the branch flow X2) flowing into the combustion chamber 18 from the intake port 19 tends to be small.

Next, referring to FIG. 10, the action of the internal combustion engine 11 of this embodiment will be described. When the intake valves 30 start to be opened, the intake air flows into the combustion chamber 18 through the intake ports 19. That is, a main flow X1 flowing in each intake port 19 without flowing into the recess 50, and branch flows X2 flowing in the recesses 50, of each intake port 19 flow into the combustion chamber 18 between the intake connecting portion 191 of the intake port 19 and the umbrella part 32 of the intake valve 30.

The recesses 50 are provided at respective portions, on both sides in the predetermined direction, of the peripheral surface 19A of the intake port 19 and each extend in the extending direction of the intake port 19. Therefore, the branch flows X2 flowing out of the recesses 50 of the intake port 19 do not flow substantially perpendicularly (downward in FIG. 1) toward the inside of the combustion chamber 18. Accordingly, the main flow X1 flowing into the combustion chamber 18 from the intake port 19 without flowing into the recess 50 is unlikely to be pushed to the piston 15 side (i.e., the lower side in FIG. 1) by the branch flows X2.

The recess 50 is configured to be deepest at its downstream end. Therefore, as shown in FIG. 10, the branch flows X2 flow along the main flow X1 on both sides in the predetermined direction of the main flow X1. As a result, collision of the main flow X1 and the branch flows X2 in the intake port 19 immediately before flowing into the combustion chamber 18 is suppressed, and therefore, the occurrence of turbulence in the vicinity of the umbrella part 32 of the intake valve 30 is suppressed.

Then, the intake air flowing into the combustion chamber 18 from the intake port 19 proceeds to the exhaust valve bottom surface 421 of the umbrella part 42 of the exhaust valve 40. Then, the intake air whose flow direction is changed by the exhaust valve bottom surface 421 flows along the exhaust valve bottom surface 421 and then flows along the inner peripheral surface of the cylinder 14 toward the piston 15. Thereafter, the intake air having reached the top surface 151 of the piston 15 flows along the top surface 151 and then flows along the inner peripheral surface of the cylinder 14 toward the intake valve 30. In this event, when the intake valve 30 is not yet closed, the intake air flowing in the combustion chamber 18 in this way joins the intake air flowing in from the intake port 19 and flows in the combustion chamber 18 along the combustion chamber wall surface 181 in a counterclockwise direction in FIG. 1.

According to the configuration and action described above, the following effects can be obtained. (1) Since the recesses 50 are provided on the peripheral surface 19A of the intake port 19 on both sides in the predetermined direction, the main flow X1 is unlikely to be pushed to the piston 15 side by the branch flows X2. This makes it easy to cause the intake air flowing into the combustion chamber 18 from the intake port 19 to proceed to the exhaust valve bottom surface 421. Therefore, the intake air is allowed to flow along the exhaust valve bottom surface 421 so that it is possible to suppress a reduction in the turning radius of the flow of the intake air in the combustion chamber 18. Consequently, it is possible to generate a strong tumble flow in the combustion chamber 18.

(2) Specifically, the inclination angle, with respect to the mounting surface 13A, of the flow direction of the branch flow X2 that flows into the combustion chamber 18 from the recess 50 of the intake port 19 and proceeds to the exhaust valve bottom surface 421 is set to be greater than "0 (zero)" and less than or equal to the exhaust bottom surface angle θ, which is the inclination angle of the exhaust valve bottom surface 421. With this configuration, it is easy to cause the entire intake air containing both the main flow X1 and the branch flows X2 to flow along the exhaust valve bottom surface 421. As a result, the entire intake air flows along the combustion chamber wall surface 181 so that the turning radius of the flow of the intake air in the combustion chamber 18 is less likely to become small. Therefore, it is possible to generate a strong tumble flow in the combustion chamber 18.

(3) In the intake connecting portion 191, the portion on the side away from the exhaust valve 40 is formed as the separation wall 191A that is connected at a substantially right angle to the intake upstream portion 192. As a result, since the occurrence of a reverse tumble flow in the combustion chamber 18 is suppressed, a tumble flow can be made less likely to weaken.

(4) In the internal combustion engine 11 of this embodiment, the recesses 50 are provided at respective portions, on both sides in the predetermined direction (i.e., the extending direction of the engine output shaft 16), of the peripheral surface 19A of the intake port 19. Therefore, compared to a case in which the recess 50 is provided at only one of the portions, on both sides in the predetermined direction, of the peripheral surface 19A, it is possible to increase the flow amount of the intake air from the intake port 19 into the combustion chamber 18.

The embodiment described above may be changed to the following other embodiments. In the embodiment described above, the recesses 50 are provided at respective portions, on both sides in the predetermined direction, of the peripheral surface 19A of the intake port 19. However, the embodiments are not limited thereto. The recess 50 may be provided only at one of the portions on both sides in the predetermined direction, of the peripheral surface 19A of the intake port 19. That is, the recess 50 may be provided only at the outer portion or only at the inner portion, in the predetermined direction, of the peripheral surface 19A of the intake port 19. Even in this case, compared to a case in which no recess 50 is provided on the peripheral surface 19A of the intake port 19, it is possible to increase the flow amount of the intake air from the intake port 19 into the combustion chamber 18.

The number of the intake ports 19 provided for each cylinder 14 may be a number other than two (e.g., one or three). Even in this case, by providing the recess 50 at least at one of the two portions, on both sides in the predetermined direction, of the peripheral surface 19A of the intake port 19, the effects similar to (1) and (2) described above can be obtained.

What is claimed is:

1. An internal combustion engine that is configured to introduce intake air to a combustion chamber and generate a tumble flow in the combustion chamber, the internal combustion engine comprising:
    a cylinder head including an intake port connected to the combustion chamber;
    an intake valve including an intake umbrella part; and
    an output shaft,
    wherein
    the intake port includes a connecting portion and an upstream portion, the connecting portion has a passage cross-sectional area that increases as the connecting portion approaches the combustion chamber, and the upstream portion is connected to an upstream end of the connecting portion,
    the intake port includes a valve seat provided at a downstream end of the connecting portion, and the intake umbrella part of the intake valve is configured to contact the valve seat,
    the intake port has at least one recess provided at least at one of two portions, the two portions located on both sides in an extending direction of the output shaft, of a peripheral surface of the intake port, the at least one recess extends in an extending direction of the intake port and is included in the connecting portion and the upstream portion,
    the at least one recess extends linearly axially in the extending direction of the intake port from an opening on the combustion chamber side of the intake port, and
    the at least one recess is deepest at its most downstream end.

2. The internal combustion engine according to claim 1, further comprising
    a cylinder block, and
    an exhaust valve including an exhaust umbrella part,
    wherein
    the cylinder head is mounted on a mounting surface of the cylinder block,
    the exhaust umbrella part of the exhaust valve includes an exhaust valve bottom surface that faces toward the combustion chamber,
    the intake umbrella part of the intake valve includes a port-side umbrella surface that faces toward the intake port, and
    a value ($\rho$) obtained by dividing a sum of a recess angle ($\varepsilon$) and an intake-side inclination angle ($\beta$) by 2 is greater than zero and less than or equal to an exhaust bottom surface angle ($\theta$), where the recess angle ($\varepsilon$) is an angle of an extending direction of the recess with respect to the mounting surface, the intake-side inclination angle ($\beta$) is an inclination angle of a portion, closest to the exhaust valve, of the port-side umbrella surface with respect to the mounting surface, and the exhaust bottom surface angle ($\theta$) is an inclination angle of the exhaust valve bottom surface with respect to the mounting surface.

3. The internal combustion engine according to claim 1, wherein
    the intake port has two of the recesses, one of the two recesses provided at each of the two portions located on both sides in the extending direction of the output shaft.

* * * * *